United States Patent [19]

Uzu

[11] 4,258,818
[45] Mar. 31, 1981

[54] FOUR-WHEEL DRIVE TRACTOR

[75] Inventor: Hideo Uzu, Hirakata, Japan

[73] Assignee: Toyosha Co., Ltd., Kadoma, Japan

[21] Appl. No.: 10,976

[22] Filed: Feb. 9, 1979

[30] Foreign Application Priority Data

Mar. 22, 1978 [JP] Japan .................. 53-32712

[51] Int. Cl.³ ............................................ B60K 17/30
[52] U.S. Cl. .................... 180/233; 180/255; 180/257
[58] Field of Search .............. 180/254, 255, 256, 257, 180/258, 259, 261, 249, 250, 233

[56] References Cited

U.S. PATENT DOCUMENTS

| | | | |
|---|---|---|---|
| 2,189,695 | 2/1940 | Alden | 180/254 |
| 3,157,395 | 11/1964 | Budzynski et al. | 180/257 |
| 3,295,624 | 1/1967 | Lee et al. | 180/255 |
| 3,420,327 | 1/1969 | Nallinger et al. | 180/255 |

*Primary Examiner*—John J. Love
*Assistant Examiner*—Donn McGiehan
*Attorney, Agent, or Firm*—Wenderoth, Lind & Ponack

[57] ABSTRACT

A four-wheel drive tractor is provided with a front-wheel driving mechanism according to the invention, a universal joint is interposed in a portion of the front-wheel drive shaft system which carries out the front-wheel drive and intersects with the center axis of the kingpin. A universal joint housing encloses the universal joint and is divided into upper and lower parts along a plane perpendicular to the center axis of the kingpin, and the lower universal joint housing part is interlocked with a yoke and is pivotable in relation to the upper universal joint housing part together with the front wheels.

8 Claims, 7 Drawing Figures

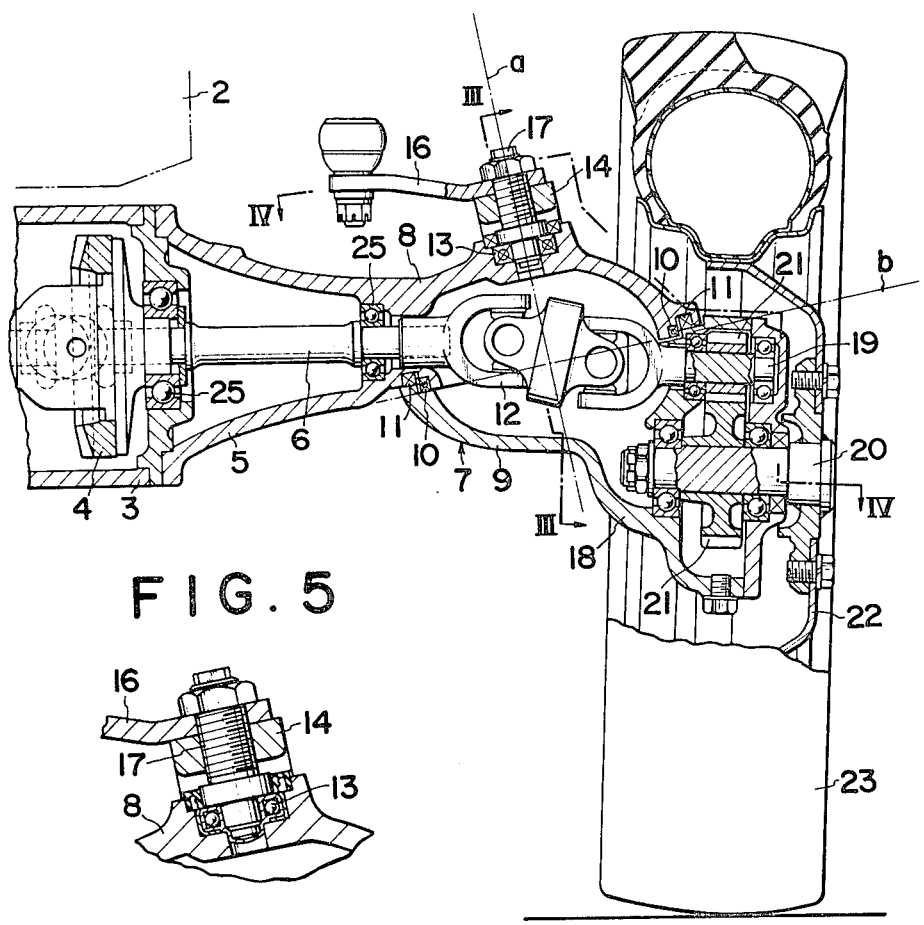

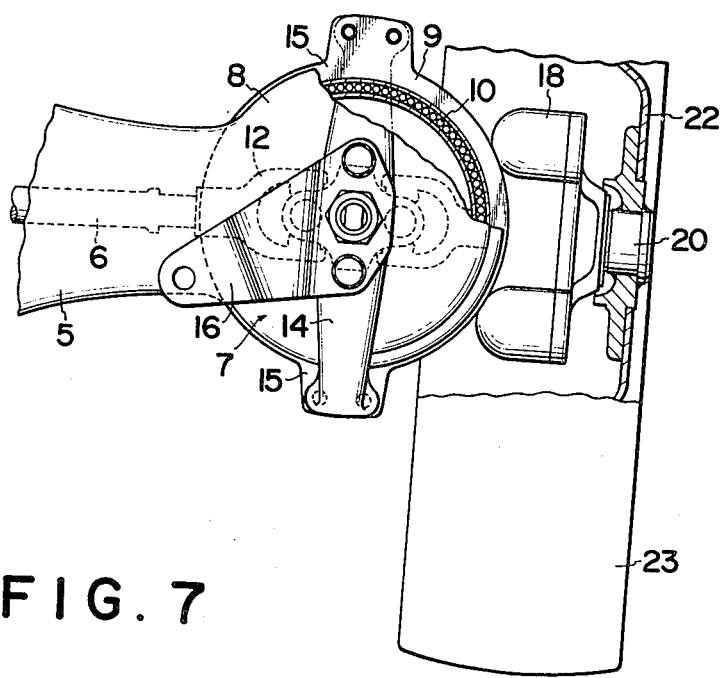
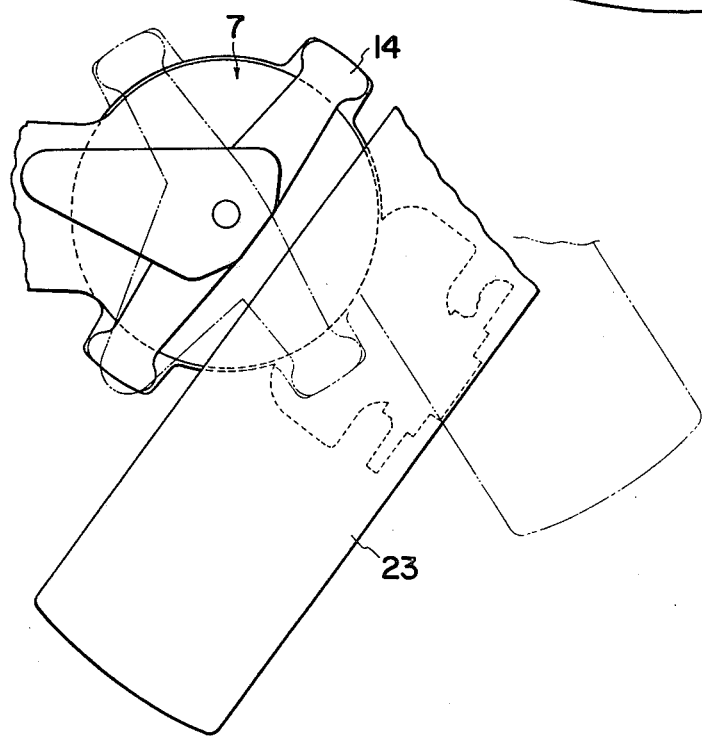

FOUR-WHEEL DRIVE TRACTOR

BACKGROUND OF THE INVENTION

The present invention relates to a front-wheel driving mechanism in a four-wheel drive tractor provided with a front-wheel driving mechanism.

The prior art relating to a structure which drives the front wheels in a four-wheel drive tractor discloses a structure wherein a plurality of bevel gears are assembled around the outer circumference of a kingpin and power is transmitted to the front wheels through the meshed bevel gears or other structure and from the meshed gears through a universal joint forming a portion of a front-wheel driving shaft system. In such a tractor provided with a structure which drives both the front and rear wheels, the driving force is significantly increased but the turning ability is significantly reduced in comparison with a two-wheel drive tractor which drives the rear wheels only. In the two above described structures, the turning range is significantly limited on account of the presence of the bevel gears and the universal joint housing. As a result, although a prior art two-wheel tractor which drives only the rear wheels can be turned at a turning angle of nearly 65 degrees, a tractor provided with a front-wheel driving mechanism can be turned at an angle of only 45 degrees at the most. When a tractor having a small turning angle is used on the farm where sharp turning angles are particularly required, the usefulness and safety are significantly hindered. Therefore an improvement in this type of tractor has long been desired.

SUMMARY OF THE INVENTION

It is an object of the present invention to provide a fourwheel drive tractor housing a front-wheel driving mechanism, and having a front-wheel turning mechanism which can turn the front wheels through approximately 60 degrees.

It is another object of the present invention to provide a four-wheel drive tractor comprising a front-wheel driving mechanism which can transmit power to the front wheels by a simple mechanism.

Other objects and advantages of the invention will become apparent from the following discussion taken with the accompanying drawings.

BRIEF DESCRIPTION OF THE DRAWINGS

FIG. 2 is an enlarged partial sectional view illustrating the main part of the present invention in detail;

FIG. 4 is a sectional view taken on line IV—IV in FIG. 2;

FIG. 5 is an enlarged sectional view of a kingpin;

FIG. 6 is an enlarged sectional view illustrating a connection between upper and lower parts of a universal joint housing; and FIG. 7 is a plan view of the kingpin illustrating the position of the parts during a turning operation.

DETAILED DESCRIPTION OF THE INVENTION

Figure 1:
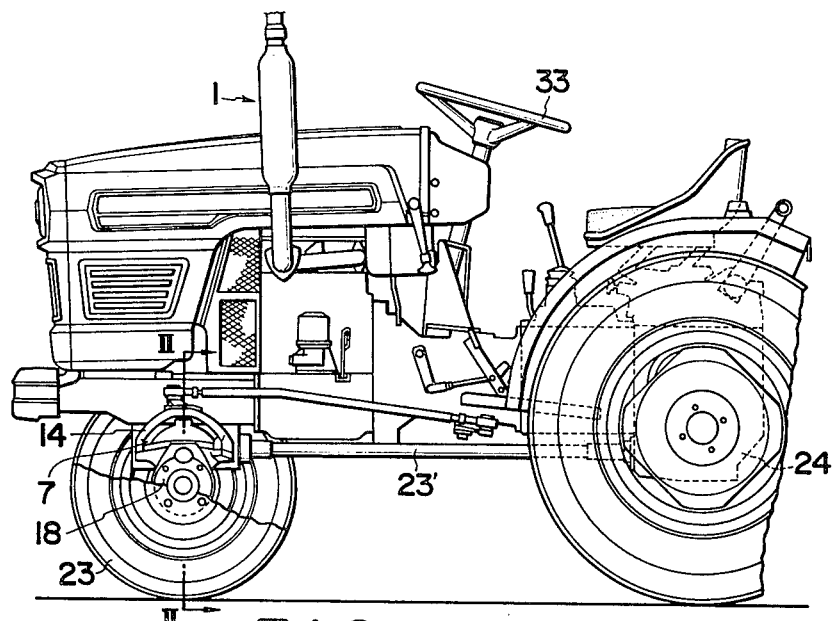
FIG. 1 is a side elevational view of a complete four-wheel drive tractor according to the present invention.
Figure 3:
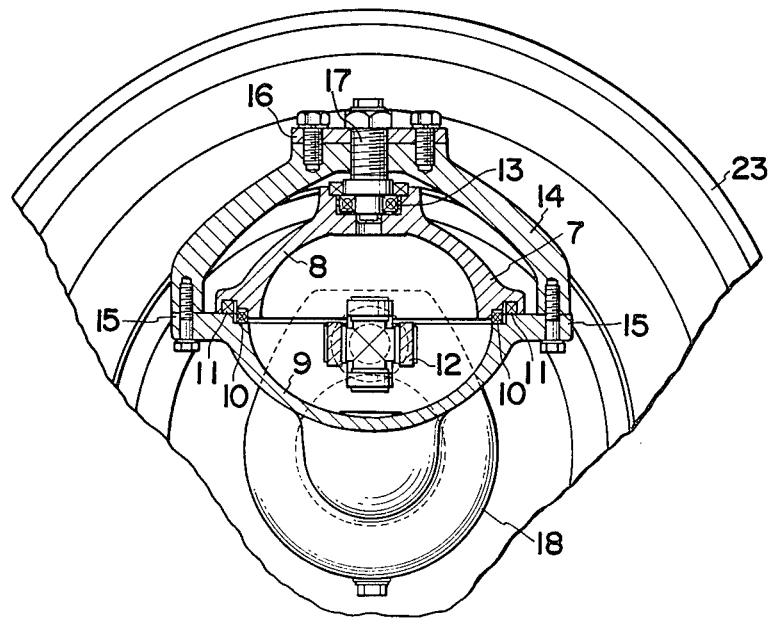
FIG. 3 is a partial sectional view taken on line III—III in FIG. 2.

Details of the present invention will now be explained using the reference numerals in the drawings.

Reference numeral (1) generally designates a four-wheel drive tractor provided with a front-wheel driving mechanism. A bracket (2) for a front axle is mounted on the front portion of the tractor (1), and a differential locking mechanism housing (3) is provided below the bracket (2). The differential locking mechanism housing (3) encloses a differential locking mechanism (4), to which is connected the front end of a drive shaft (23') mounted along the bottom of the tractor (1) in the longitudinal direction.

A pair of shaft housings 5 extend laterally from opposite sides of the differential locking mechanism housing (3) towards the opposite sides of the tractor (1), and at the outer ends of the shaft housings (5) are universal joint housings (7). Within the shaft housings (5) and the universal joint housings (7) is rotatably mounted in bearings (25) a front-wheel driving shaft (6), and one end of the shaft (6) is connected to the differential locking mechanism (4).

A kingpin (17) which is mounted on each universal joint housing (7) at a suitable kingpin angle is pivotable in the transverse direction in a thrust bearing (13). As shown most clearly in FIG. 2, the universal joint housing (7) consists of an upper universal joint housing part (8) which is unitary with the shaft housing (5) and a lower universal joint housing part (9) which is a separate piece, said upper and lower parts being joined. Each universal joint housing (7) has therein a universal joint (12), one end of which is connected to the corresponding front-wheel driving shaft (6). A gear case (18) is integral with the lower universal joint housing part (9). The mating surfaces of the upper and lower universal joint casing parts (8) and (9) are formed in a plane (b) which is perpendicular to the central axis (a) of the kingpin (17). Since the universal joint housing (7) is divided into the upper and lower parts in a plane perpendicular to the central axis (a) of the kingpin as above described, a much greater turning angle can be attained than in the prior art tractors of this type.

Referring to FIG. 6, the upper universal joint housing part (8) is provided with an annular projection (26) which protrudes downward along the inner circumferential portion of the mating surface. The upper and lower universal joint housing parts (8) and (9) are so connected with each other that said annular projection (26) extends downward to the lower universal joint element (9) along the inner circumferential wall of the housing (7). Opposed portions of both mating surfaces are cut away to define a pair of upper and lower opposed annular recesses (27) and (28). A ball bearing (10) is mounted in the two recesses (27) and (28) and has an outer race (29) in the recess (28) and an inner race (30) in the recess (27). An O-ring (31) is positioned between the outer race (29) and the outer corner of the recess (28) in the lower housing part (9). At the outer circumferential portion of the recess (27) in the upper housing part (8) is downwardly open annular recess (32) which is in communication with the recess (27). Between recesses (32) and (27) is a race element (29') which is constituted by an upward extension of the outer race (29). An annular seal (11) is positioned in the recess (32) and seals the joint between the upper and lower parts (8) and (9).

Since the seal (11) is interposed between the mating surfaces of the universal joint housing (7) as described, mud cannot enter between the mating surfaces and leakage of oil from within the universal joint housing (7) can be prevented without hindering the pivotal motion of the lower universal joint housing part (9) with respect to the upper universal joint housing part (8).

The mating surface of the lower universal joint housing part (9) is provided with laterally projecting tongues (15) which are spaced at 180 degrees from each other around the housing for mounting a connecting arm (14) thereon as hereinafter described. Said connecting arm (14) is bent in a circular arc so as to surround the outer circumference of the upper universal joint housing part (8). The two ends of the connecting arm (14) are fixed to said tongues (15) by bolts, and the top of the arm is fixed to the kingpin (17).

One end of a yoke (16) is fixed to the kingpin (17), and the yoke (16) is pivotable in a horizontal direction together with the kingpin (17) and the connecting arm (14).

The gear case (18) is integral with the bottom of the lower universal joint housing part (9). The gear case (18) is provided with two rotatable shafts (19) and (20), one above the other. The two shafts (19) and (20) are connected by means of a pair of upper and lower gears (21) and (21') meshing with each other. The upper shaft (19) has the other end of said universal joint (12) connected thereto; the lower shaft (20) carries a front wheel (23) on a hub (22). Power which is transmitted through the rotation of the drive shaft (23') to the differential locking mechanism (4) is further transmitted through the front-wheel driving shaft (6), the universal joint (12), the gears (21) and (21'), the shaft (20) and the hub (22) to the front wheel (23) for the front-wheel drive. When the tractor body (1) is being driven by the front and rear wheels, if a steering wheel (33) is rotated through any angle in either direction to turn the tractor (1), the rotation of the steering wheel (33) is transmitted through tie rods or the like to the yoke (16) which is pivoted through corresponding angle around the axis (a) of the pin 17. The pivotal motion of the yoke (16) is transmitted to the connecting arm (14) to pivot the connecting arm (14) to pivot the connecting arm (14) around the axis (a) of the kingpin (17) through the same angle as the yoke (16). The pivotal motion of the connecting arm (14) around the kingpin (17) causes the gear case (18) integral with the lower universal joint housing part (9) which is connected to the connecting arm (14) to pivot around the kingpin axis (a) through the same angle. The pivotal motion of the gear case (18) produces a steering motion of the front wheel (23) through the same angle in order to carry out the turning of the tractor.

As described above, the present invention provides a universal joint (12) which is a portion of the front-wheel driving system, and a universal joint housing (7) which encloses the universal joint (12) which is divided into the upper and lower parts along a plane perpendicular to the kingpin axis (a), whereby a turning angle of about 60 degrees can be obtained as compared with the prior art structure which can be turned at the most through an angle of only 45 degrees.

What is claimed is:

1. A four-wheel drive tractor comprising: front wheels, means for supplying driving power to said front wheels, a driving shaft means connecting said driving power supplying means with each of said front wheels, a shaft case enclosing each front wheel driving shaft means, a kingpin for each shaft case, each front wheel driving shaft means having a universal joint therein connected to the corresponding front wheel and intersecting an extension of the axis of said kingpin, a universal joint housing enclosing each universal joint and being divided along a plane perpendicular to the axis of said kingpin into upper and lower housing parts to define engaging mating surfaces for permitting relative rotation of said universal joint housing parts around the axis of said kingpin, each upper universal joint housing part being fixed to the corresponding shaft housing and each lower universal joint housing part carrying a corresponding front wheel, and steering means connected to said lower universal joint housing parts for rotating said lower universal joint housing parts relative to the upper universal joint housing parts for turning said wheels around the axes of said kingpins for steering the tractor.

2. A four-wheel drive tractor as claimed in claim 1 in which each kingpin is mounted on the corresponding upper universal joint housing part.

3. A four-wheel drive tractor as claimed in claim 1 in which said steering means comprises an arc-shaped connecting arm for each wheel having the ends connected to the corresponding lower universal joint housing part and the central portion mounted for pivotal movement around the axis of the corresponding kingpin, and means connected to said connecting arms for rotating said connecting arm around the axis of said kingpins.

4. A four-wheel drive tractor as claimed in claim 1 in which each upper universal joint housing part has a shaft bearing therein which the input shaft of the corresponding universal joint is mounted, and each lower universal joint housing part has a shaft bearing therein in which the output shaft of the corresponding universal joint is mounted.

5. A four-wheel drive tractor as claimed in claim 1 in which the opposed mating surfaces of the respective upper and lower universal joint housing parts have bearing means and sealing means therebetween for enabling the housing parts to rotate relative to each other and for sealing the joint between the mating surfaces against ingress of dirt and escape of lubricant from within the housing.

6. A four-wheel drive tractor as claimed in claim 5 in which the opposed mating surfaces each have a recess therein opposed to the recess in the other mating surface, and said bearing means is positioned in the opposed recesses.

7. A four-wheel drive tractor as claimed in claim 6 in which the recess in one of said mating surfaces has a portion extending radially outwardly of the recess in the other mating surface, and said sealing means comprises a seal in said radially outwardly extending portion and engaging both said upper and lower universal joint housing parts.

8. A four-wheel drive tractor as claimed in claim 7 in which said bearing means includes a bearing race in the recess in said other mating surface, said bearing race extending into said recess in said one mating surface and dividing said radially outwardly extending portion from the remainder of said recess in said one mating surface, and said seal engaging said bearing race where it extends into said recess in said one mating surface.

* * * * *